United States Patent [19]
Geisler et al.

[11] Patent Number: 4,465,655
[45] Date of Patent: Aug. 14, 1984

[54] PROCESS FOR THE PURIFICATION OF EXHAUST GASES CONTAINING SULFURYL FLUORIDE

[75] Inventors: Klaus Geisler, Bonn-Beuel; Hans-Hermann Heins, Leverkusen; Helmut Coulon, Cologne; Reiner Kriwalski, Leverkusen, all of Fed. Rep. of Germany

[73] Assignee: Bayer Aktiengesellschaft, Leverkusen, Fed. Rep. of Germany

[21] Appl. No.: 438,178

[22] Filed: Nov. 1, 1982

[30] Foreign Application Priority Data

Nov. 12, 1981 [DE] Fed. Rep. of Germany ....... 3145012

[51] Int. Cl.³ .............................................. B01D 53/36
[52] U.S. Cl. .................................... 423/240; 423/490; 423/551; 204/101

[58] Field of Search .......... 423/240 R, 240 S, 242 A, 423/242 R, 468, 469, 490, 551; 204/101

[56] References Cited

U.S. PATENT DOCUMENTS

3,361,532 1/1968 Massonne .......................... 423/469

FOREIGN PATENT DOCUMENTS

1212945 3/1966 Fed. Rep. of Germany .
1230772 12/1966 Fed. Rep. of Germany ...... 423/469

Primary Examiner—Earl C. Thomas
Attorney, Agent, or Firm—Connolly and Hutz

[57] ABSTRACT

A process for the removal of sulfuryl fluoride from exhaust gases is improved by reacting sulfuryl fluoride in the exhaust gases with a dilute aqueous alkali metal hydroxide or alkali metal carbonate solution on an active carbon catalyst.

7 Claims, 1 Drawing Figure

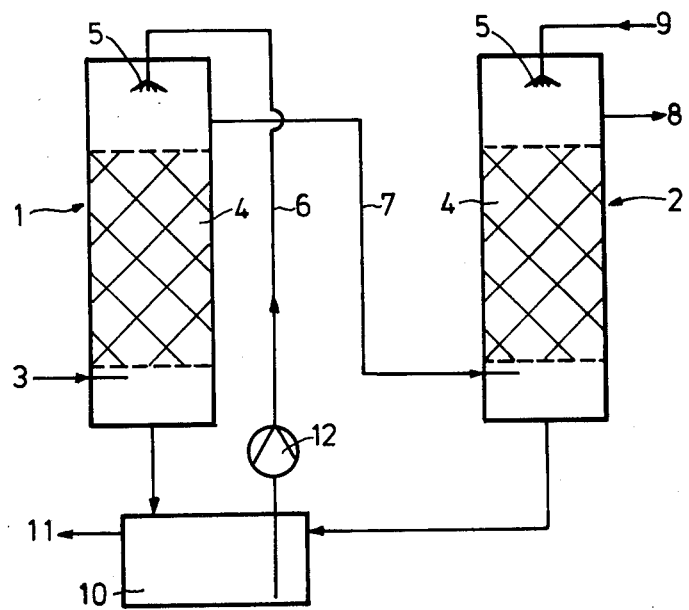

PROCESS FOR THE PURIFICATION OF EXHAUST GASES CONTAINING SULFURYL FLUORIDE

BACKGROUND OF THE INVENTION

This invention relates to a process for the purification of gases contaminated by sulfuryl fluoride ($SO_2F_2$). Gases of that type are formed, for example, in the production of sulfur hexafluoride or in the electrochemical fluorination of sulfur-containing compounds. The production of $SF_6$ from the elements is accompanied, due to the presence of impurities in the starting materials, by the accumulation of a crude gas contaminated by $SO_2F_2$ (see German Auslegeschrift No. 12 12 945 and No. 12 30 775). Such contaminated gas must be completely purified before the $SF_6$ can be used for technical applications. The electrofluorination of sulphur-containing compounds is accompanied by the formation of an exhaust gas which, although largely hydrogen, also contains small fractions of $SO_2F_2$ which must be eliminated before its release into the factory exhaust because sulfuryl fluoride can hydrolyse to form polluting compounds such as hydrofluoric and fluorosulfonic acid or hydrofluoric and sulfuric acid.

Although it undergoes measurable hydrolysis at 20° C. (G. H. Cady and S. Misra, Inorg. Chem. 13 (4). 837–841. (1974)), sulfuryl fluoride reacts very slowly with water, particularly if it is heavily diluted with inert gases, such as sulfur hexafluoride (DE-AS Nos. 12 12 945 and 12 30 772). It is also known that alkaline hydrolysis does not yield fluoride and sulfate ions (equation 1), but rather fluorosulfate ions instead (cf. for example M. M. Jones and W. L. Lockhar, J. Inorg. Nucl. Chem. 30, 1237 (1968), equation 2):

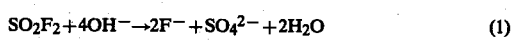

$$SO_2F_2 + 4OH^- \rightarrow 2F^- + SO_4^{2-} + 2H_2O \quad (1)$$

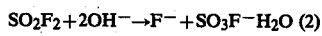

$$SO_2F_2 + 2OH^- \rightarrow F^- + SO_3F^- - H_2O \quad (2)$$

Thus, in addition to fluoride, the fluorosulfate ion (which is much more difficult to precipitate) accumulates instead of the fluoride and sulfate ions, which would be easy to precipitate from water.

Accordingly, it has been proposed to absorb sulfuryl fluoride on solids, such as aluminium oxides, molecular sieves, hydroxides, oxides, carbonates and hydrogen carbonates of the elements of the 1st and 2nd Main Group of the periodic table, or on inert materials impregnated with oxides, hydroxides or carbonates of the 1st and 2nd Main Group of the periodic table, at temperatures in the range from −50° C. to 350° C. (See German Auslegeschrift Nos. 12 12 945 and 12 30 772). However, these processes are characterised by minimal utilization of the alkali available because sulfuryl fluoride only reacts on the solid surface offered to it with a shallow depth of penetration so that these processes are uneconomical, particularly when carried out continuously on a large scale.

SUMMARY OF THE INVENTION

Accordingly, the object of the present invention is to completely remove sulfuryl fluoride from exhaust gases to form fluoride and sulfate ions in accordance with equation (1) with maximum utilization of the alkali available.

It has now surprisingly been found that $SO_2F_2$ can be removed substantially completely from exhaust gases such as those accumulating in electrofluorination or in the production of $SF_6$ by reacting $SO_2F_2$ with dilute aqueous alkali metal hydroxide or carbonate solution on an active carbon catalyst. It was equally unexpected to find that up to 90% of the alkali theoretically available according to equation (1) can be utilized without diminishing the effectiveness of gas washing. In general, such a high degree of utilization of the washing liquids used in the process is not even approached in prior gas washing operations.

BRIEF DESCRIPTION OF THE DRAWING

The FIGURE shows a two-stage gas washing according to the present process.

DETAILED DESCRIPTION

The present invention provides a process for removing sulfuryl fluoride from exhaust gases by reacting the exhaust gas with alkali metal hydroxides and/or carbonates, characterised in that the reaction is carried out in dilute aqueous alkali metal hydroxide and/or carbonate solution on an active carbon catalyst.

The process according to the invention may be carried either in a single stage or in several stages. The number of stages depends upon the required purity of the exhaust gas issuing from the last stage.

The concentration of the alkali metal hydroxide or carbonate solutions used may be varied within wide limits according to the solubility of the substance used in water. Solutions with a concentration of 3 to 10% hydroxide or carbonate have proved to be effective and are particularly preferred because the alkali metal fluorides and sulfates formed in concentrations of that order dissolve particularly readily.

All available types of active carbon may be used in the process according to the invention with a distinction being drawn between hydrophobic and hydrophilic types. Hydrophobic types of active carbon are understood to be those which have been subjected to a chemical activation (for example with zinc chloride) and which may optionally be reactivated with steam. Active carbons of this type require long residence times, low gas velocities, high temperatures and high concentrations of alkali metal hydroxides and/or carbonates in the wash liquor so that the fluorides and sulfates produced can be precipitated.

Hydrophilic active carbons such as steam activates based on lignite coke having a BET-surface of at least 400 m²/g and preferably greater than 600 m²/g have proved to be particularly suitable. Carbons of this type permit higher gas velocities, lower residence times, lower concentrations of alkali hydroxides and/or carbonates and lower temperatures by comparison with hydrophobic active carbons. They are particularly preferred for these reasons.

Gas washing by the process described is carried out at temperatures in the range from 5° to 95° C. and preferably at temperatures in the range from 20° to 60° C. In the case of multistage installations, the gas stream and the stream of washing liquid are passed in countercurrent streams in such a way that the last stage is charged with fresh alkali metal hydroxide or carbonate solution which is then passed through the individual washing stages in countercurrent to the gas stream. Within the individual washing stages and in the case of single-stage gas-washing installations, the liquid and gas streams may be passed through in parallel current and countercurrent.

The washing liquor charged with fluoride and sulfate ions may be regenerated by methods which are per se known. For example, calcium oxide, hydroxide or carbonate may be added to precipitate the fluoride and sulfate ions and the alkali metal hydroxide or carbonate solution thus regenerated may be recirculated. The sparingly soluble calcium salts thus formed may be discarded. Anion exchanger resins may also be used for regeneration.

The process according to the invention is illustrated in the accompanying drawing which shows by way of example a two-stage version of the process.

The reference numerals appearing in the drawing have the following meanings: 1=washing stage 1; 2=washing stage 2; 3=exhaust gas input; 4=active carbon filling; 5=washing liquid input; 6=alkali liquor circuit; /=gas pipe; 8=exhaust outlet; 9=liquor input; 10=liquor reservoir; 11=liquor outlet; and 12=liquor pump.

The exhaust gas to be purified enters washing stage 1 from below at input 3 and flows through the active carbon filling 4 countercurrent to the washing liquor 5 fed in from above and circulated through the pipe 6. The exhaust gas leaves stage 1 through pipe 7 and, in washing stage 2, is washed with fresh liquor introduced at input 9 in contact with the active carbon filling 4. Purified exhaust gas issues at outlet 8. The liquor used in stage 2 flows out from the bottom of that stage and is delivered to the reservoir 10 from which it is circulated to stage 1 by means of the pump 12. Used liquor is removed from the circuit at outlet 11.

EXAMPLES

Example 1

The exhaust gas from an electrofluorination cell is treated in a two-stage washing installation as illustrated in the FIGURE of which the washing towers have an internal diameter of 100 mm and are provided with an active-carbon filling (lignite coke steam activate, BET surface of 800 m²/g) 850 mm deep. The washing liquid used is 5% sodium hydroxide at a temperature of 40° C. and 5.0 liters per hour are used. 700 liters of exhaust gas per hour are fed in. Table 1 shows the analytical data after 100 hours' operation.

TABLE 1

|  | Input % by vol. | After stage 1 % by vol. | After stage 2 % by vol. |
|---|---|---|---|
| $H_2$ | 77.70 | 78.50 | 79.90 |
| $N_2$ | 14.80 | 16.50 | 17.00 |
| Ar | 0.10 | 0.10 | 0.10 |
| $CO_2$ | 0.59 | 0.02 | 0.02 |
| Perfluoroalkanes | 1.70 | 1.70 | 1.70 |
| $SO_2F_2$ | 4.80 | 0.11 | 0.003 |
| $SF_6$ | 0.08 | 0.08 | 0.08 |

The liquor issuing from stage 1 contains 0.8% of NaOH. 99.93% of the $SO_2F_2$ is removed from the exhaust gas. The utilization of the sodium hydroxide available based on equation (1) is 78.4%.

Example 2

An apparatus of the type described in Example 1 is operated at 20° C. with 3% potassium hydroxide. Stage 2 is charged with 5 l/h of fresh liquor, 9 l/h are pump-recirculated to stage 1 and 5 l/h flow off through the outlet. 500 l/h of exhaust gas are fed in. Table 2 shows the composition of the gas after 50 h.

TABLE 2

|  | Input % per vol. | After stage 1 % per vol. | After stage 2 % per vol. |
|---|---|---|---|
| $H_2$ | 78.90 | 82.40 | 82.48 |
| $N_2$ | 14.50 | 15.20 | 15.22 |
| Ar | 0.10 | 0.10 | 0.10 |
| $CO_2$ | 0.45 | 0.03 | 0.02 |
| Perfluoroalkanes | 1.60 | 1.60 | 1.60 |
| $SO_2F_2$ | 4.30 | 0.10 | 0.002 |
| $SF_6$ | 0.09 | 0.09 | 0.09 |

Example 3

An apparatus corresponding to that used in Example 1 is operated similarly to that described in Example 2 with an 8% soda solution at a temperature of 60° C. Table 3 shows the composition of the gas after 75 hours operation.

TABLE 3

|  | Input % by vol. | After stage 1 % by vol. | After stage 2 % by vol. |
|---|---|---|---|
| $H_2$ | 76.90 | 80.20 | 80.25 |
| $N_2$ | 16.50 | 17.00 | 16.90 |
| Ar | 0.10 | 0.12 | 0.09 |
| $CO_2$ | 0.38 | 0.75 | 0.92 |
| Perfluoroalkanes | 1.55 | 1.56 | 1.55 |
| $SO_2F_2$ | 3.80 | 0.09 | 0.002 |
| $SF_6$ | 0.11 | 0.11 | 0.11 |

What is claimed is:

1. In the process for the removal of sulfuryl fluoride from exhaust gases by reacting sulfuryl fluoride in the exhaust gas with an alkaline material, the improvement comprises reacting said sulfuryl fluoride with a dilute aqueous solution of alkali metal hydroxide or alkali metal carbonate on an active carbon catalyst.

2. The process as claimed in claim 1 wherein said solution is an aqueous solution of 3 to 10% alkali hydroxide or alkali carbonate by weight.

3. The process as claimed in claim 1 or claim 2 wherein the carbon is hydrophilic active carbon.

4. The process as claimed in claim 1 or claim 2 wherein the reaction is carried out at 5° to 95° C.

5. The process according to claim 1 wherein the alkali metal is sodium or potassium.

6. The process according to claim 1 wherein the active carbon catalyst is in a fixed bed and the exhaust gases and said aqueous solution pass through the bed in countercurrent contact.

7. The process according to claim 1 wherein the active carbon catalyst is contained in a plurality of fixed beds and the exhaust gases and said aqueous solution pass through the beds countercurrently in inverse sequence.

* * * * *